United States Patent [19]

Coale

[11] Patent Number: 5,259,529
[45] Date of Patent: Nov. 9, 1993

[54] COLLAPSIBLE INSULATED RECEPTACLE FOR BEVERAGE CONTAINERS

[75] Inventor: Matthew G. Coale, Tulsa, Okla.

[73] Assignee: Coalewrap Company, Tulsa, Okla.

[21] Appl. No.: 988,472

[22] Filed: Dec. 10, 1992

[51] Int. Cl.$^5$ .................................................. B65D 65/00
[52] U.S. Cl. ....................................... 220/739; 220/903
[58] Field of Search ................................ 220/739, 903

[56] References Cited

U.S. PATENT DOCUMENTS

| | | |
|---|---|---|
| 2,115,654 | 4/1938 | Swofford . |
| 3,285,455 | 11/1966 | Pewitt ........................... 215/100.5 |
| 3,738,529 | 6/1973 | Rose ................................. 220/85 H |
| 3,905,511 | 9/1975 | Groendal ........................... 220/90.2 |
| 4,181,765 | 1/1980 | Harmony ............................. 428/157 |
| 4,194,627 | 3/1980 | Christensen ..................... 220/903 X |
| 4,268,567 | 5/1981 | Harmony ......................... 220/903 X |
| 4,293,015 | 10/1981 | McGough .......................... 150/52 R |
| 4,372,453 | 2/1983 | Branscum ........................... 215/13 R |
| 4,510,665 | 4/1985 | Scheurer .............................. 29/460 |
| 4,534,391 | 8/1985 | Ventimiglia ....................... 150/52 R |
| 4,540,611 | 9/1985 | Henderson ............................. 428/12 |
| 4,648,525 | 3/1987 | Henderson ............................ 220/739 |
| 4,671,424 | 6/1987 | Byrns .................................. 220/408 |
| 4,681,239 | 7/1987 | Manns ................................. 220/408 |
| 4,705,085 | 11/1987 | Brown ............................ 220/903 X |
| 4,708,254 | 11/1987 | Byrns ................................ 215/13.1 |
| 4,720,023 | 1/1988 | Jeff ..................................... 220/412 |
| 4,735,333 | 4/1988 | Lay .................................... 220/90.2 |
| 4,747,507 | 5/1988 | Fitzgerald ......................... 220/85 H |
| 4,768,354 | 9/1988 | Barnwell ............................... 62/457 |
| 4,798,063 | 1/1989 | Rimmer ................................. 62/457 |
| 4,802,602 | 2/1989 | Evans et al. ........................ 220/739 |
| 4,831,842 | 5/1989 | Kelley ................................. 62/457.4 |
| 4,882,914 | 11/1989 | Haines-Keeley .................. 62/457.4 |
| 4,886,183 | 12/1989 | Fleming ............................. 220/85 H |
| 4,974,741 | 12/1990 | Gustafson ......................... 220/85 H |
| 4,986,089 | 1/1991 | Raab .................................. 62/457.4 |
| 4,989,418 | 2/1991 | Hewlett ............................. 62/457.4 |
| 5,022,235 | 6/1991 | Grissom ............................. 62/457.4 |
| 5,022,549 | 6/1991 | Beaver ............................... 220/85 H |
| 5,058,757 | 10/1991 | Proa .................................. 220/85 H |
| 5,065,879 | 11/1991 | King ..................................... 220/739 |
| 5,102,036 | 4/1992 | Orr et al. ........................ 220/903 X |
| 5,169,025 | 12/1992 | Guo ................................. 220/903 X |

*Primary Examiner*—Steven M. Pollard
*Attorney, Agent, or Firm*—Phillip B. Philbin

[57] ABSTRACT

A collapsible insulated receptacle for beverage containers which is constructed of material which is light weight, sturdy, recyclable, biodegradable, and provides a suitable medium for high quality color separation printing. The receptacle embraces the beverage container such that the consumer can maneuver the beverage container by maneuvering the receptacle. The receptacle is collapsible to a size which is easily and efficiently transported before sales or distribution and able to be transported by the consumer in a clothes pocket.

9 Claims, 2 Drawing Sheets

COLLAPSIBLE INSULATED RECEPTACLE FOR BEVERAGE CONTAINERS

BACKGROUND OF THE INVENTION

This invention relates to a receptacle for beverage containers, and, more particularly, to a receptacle for beverage containers which is collapsible, insulated, economical to produce, recyclable, biodegradable, compact, and fabricated of a material which provides a suitable medium for high quality color separation printing.

A myriad of beverages are readily available in cans and bottles for personal consumption. The vast majority of these beverages are served chilled. In order to preserve the chilled state during consumption, a variety of devices are available to insulate the beverage and its container. Since the consumption of these beverages takes place everywhere, these devices must be available everywhere. Accordingly, size, weight, and transportability are important considerations. The devices available are either in the form of wrap-around insulators or receptacles for the beverage containers.

The wrap-around insulators are typically covered in a fabric material and have a fastener that is easily unfastened to allow the insulator to be moved from container to container. The fabric material provides a surface which accommodates a limited amount of printing. These wrap-around insulators do not collapse to a size which is easily transported in personal clothing. Further, the wrap-around devices do not firmly embrace the beverage container. This firm embrace is necessary to give the consumer confidence in maintaining control of the beverage. The wrap-around insulator can slip along the beverage container and interfere with the consumption of the beverage by entering the area where the consumer's mouth engages the container.

The receptacles for insulating beverage containers are constructed of materials ranging from rigid plastic to flexible foam. These receptacles typically embrace the beverage container such that the person consuming the beverage only needs to maneuver the receptacle to maneuver the container and the beverage as well. To achieve this embrace, the receptacle must conform to the outer surface of the beverage container.

In the foam design, this embrace is achieved when the foam conforms to the outer surface of the container. However, the foam design can be difficult to remove from the container, particularly when the container is in the form of a can.

The rigid plastic designs either accommodate one size of container or have an adjustable embracing device to accommodate a variety of container sizes. These plastic designs do not collapse or reconfigure. The plastic outer surface provides for a limited amount of printing.

Both the flexible foam and the rigid plastic designs are bulky in size. The flexible foam is able to be reconfigured but does not collapse. The inability to be collapsed is not only a deterrent to the consumer, but adds to the sales price due to increased shipping and handling costs. Further, the foam and plastic materials are both difficult to recycle and are not biodegradable.

The popularity and increased use of beverage insulators and receptacles have created an available advertising medium. The flexible foam is not suitable for high quality color separation printing. The surface of the foam limits the sharpness of the color and prevents high quality color separation printing. The plastic designs are also limited in the quality of available printing.

Thus, the use of known configurations and materials present several limitations. First, the size and configuration of the receptacles limit the ability to transport them, both before and after the sale. The materials used do not provide a print medium suitable for high quality color separation printing, are not easily recyclable, are not biodegradable, and are not as economical to produce. These limitations have ultimately limited the availability of receptacles to the consumer. The cost of manufacturing the receptacles and limitations in available printing have limited their use in advertising or other promotional markets.

SUMMARY OF THE INVENTION

It is therefore an object of the present invention to provide a receptacle for beverage containers which insulates the beverage container.

It is a further object of the present invention to provide a receptacle of the above type in which a variety of beverage containers can be used.

It is a further object of the present invention to provide a receptacle of the above type in which insulates the beverage from ambient temperature.

It is a further object of the present invention to provide a receptacle of the above type in which insulates the beverage from the consumer's hand.

It is a further object of the present invention to provide a receptacle of the above type in which the normal increase in the beverage temperature is slowed.

It is a further object of the present invention to provide a receptacle of the above type which collapses to a thin, flat shape.

It is a further object of the present invention to provide a receptacle of the above type which can be easily transported.

It is a further object of the present invention to provide a receptacle of the above type which is constructed of a material which provides a high quality color separation print medium on the outside surface.

It is a further object of the present invention to provide a receptacle of the above type which is constructed of a material which provides a high quality color separation print medium on the outside surface as a suitable advertising medium.

It is a further object of the present invention to provide a receptacle of the above type which is economical to produce.

It is a further object of the present invention to provide a receptacle of the above type which is recyclable.

It is a further object of the present invention to provide a receptacle of the above type which is biodegradable.

Toward the fulfillment of these and other objects, the receptacle for beverage containers of the present invention is constructed of a corrugated paper material with a parachute-type bottom. The corrugated paper provides a series of open air channels surrounding the beverage container to insulate the container and dissipate the heat from the consumer's hand before it reaches the container. The outer surface of the container is constructed of a paper material such that high quality color separation printing can be applied economically, efficiently, and vibrantly. The paper construction allows the receptacle to be collapsed to a size which is easy to ship and fits conveniently into a pocket of the consumer's clothing.

DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
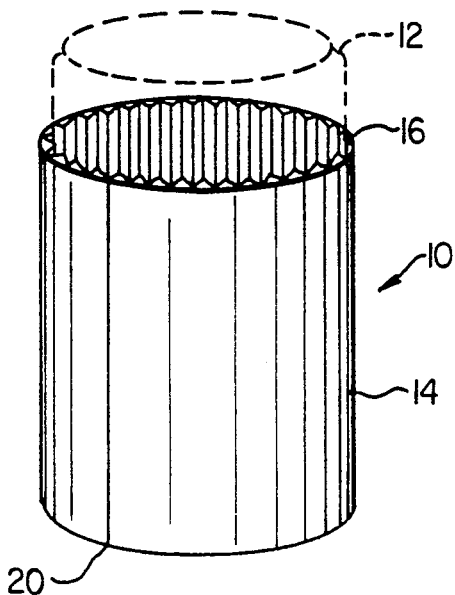
FIG. 1 is a top perspective view of the receptacle of the present invention with a beverage container (i.e., can) inserted.
Figure 2:
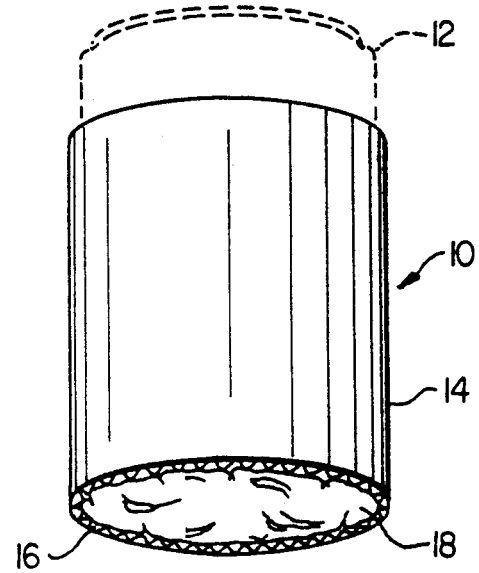
FIG. 2 is a bottom perspective view of the receptacle with a beverage container inserted.

Referring to FIG. 1, the reference numeral 10 generally refers to the receptacle of the present invention which is designed to embrace a beverage container 12 (shown as a can). As shown in FIGS. 1 and 2, the receptacle 10 is comprised of an outer sheet of paper material 14, an inner sheet of paper material 16, and a parachute bottom 18.

The outer paper sheet 14 is rectangular in shape, pliable, constructed of a paper material, insulative, biodegradable, and recyclable. The opposite ends of the outer paper sheet 14 are connected together along a line 20. The connection along line 20 allows the outer paper sheet 14 to form a cylinder.

Figure 3:
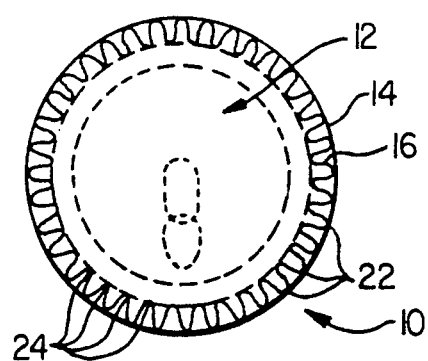
FIG. 3 is a top view of the receptacle with a beverage container inserted.

The inner paper sheet 16 is also pliable, constructed of a paper material, insulative, biodegradable, and recyclable. The inner paper sheet 16 is folded a series of times in opposite directions to form a corrugated surface. As shown in FIG. 3, the inner paper sheet 16 is connected to the outer paper sheet 14 at a series of folds 22, which is every other fold. An alternate series of folds 24 are formed along the innermost circle of the receptacle 10 to embrace the beverage container 12. The inner paper sheet 16 is connected to the outer paper sheet 14 in a known manner, such as by gluing.

Figure 4:
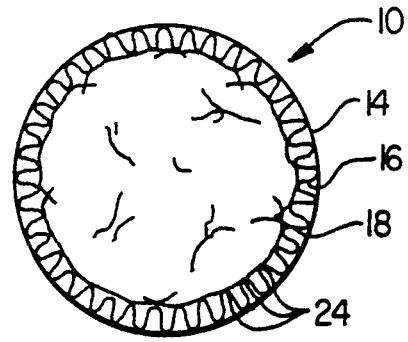
FIG. 4 is a bottom view of the receptacle with a beverage container inserted.

As shown in FIG. 4, the parachute bottom 18 is connected to the inner paper sheet 16 in a known manner, such as by gluing, along the lower portion of the series of folds 24. The parachute bottom is positioned within the interior of receptacle 10 to engage the beverage container 12 (as shown in FIG. 2), when inserted, and to restrict the beverage container from exiting the lower end of the receptacle 10.

Figure 5:
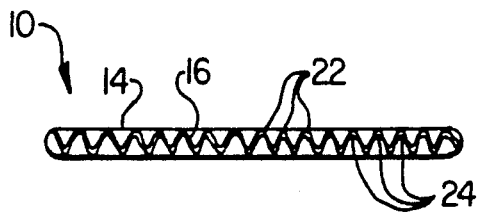
FIG. 5 is a top view of the receptacle when collapsed.
Figure 6:
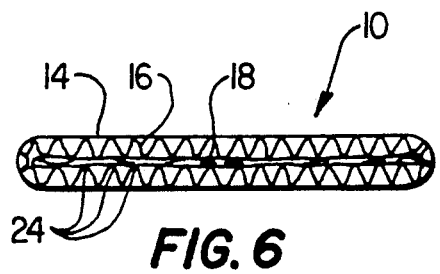
FIG. 6 is a bottom view of the receptacle when collapsed.

As shown in FIGS. 5 and 6, the receptacle 10 can be collapsed. When collapsed, the inner paper sheet 16 interlocks with its opposing sides allowing the series of folds 24 on one side to rest against the series of folds 22 on the other side. As shown in FIG. 6, the bottom section of receptacle 10 is collapsed until the parachute bottom 18 engages the series of folds 24 from both opposing sides.

In operation, the beverage container 12 is inserted in the top end of the receptacle 10. The beverage container 12 is pushed through the receptacle 10 by the consumer until it engages the parachute bottom 18. The parachute bottom 18 positions the beverage container 12 such that the majority of the beverage container 12 is surrounded by the receptacle 10 with only the top portion of the beverage container 12 exposed. The series of folds 24 of the inner paper sheet 16 engages and embraces the beverage container 12. The channels formed by both series of folds 24 and 26 ventilate the air by allowing it to pass between the outer paper sheet 14 and the inner paper sheet 16 and between the inner paper sheet 16 and the beverage container 12.

The consumer's hand grips the receptacle 10 around the outer circumference of the outer paper sheet 14. Thus, the heat from the consumer's hand is dissipated by both the outer paper sheet 14 and the ventilation provided by the series of folds 22 and 24 of the inner paper sheet 16. The beverage container 12 is insulated by the inner paper sheet 16 and the outer paper sheet 14. The insulation helps maintain the cooler temperature of the beverage.

When the beverage container 12 is removed, the receptacle 10 can be collapsed by the consumer pressing on opposite sides of the outer paper sheet 14. This pressure causes the paper sheets 14 and 16 to fold together. The inner paper sheet 16 is configured such that it interlocks with itself through the folds 24. The parachute bottom 18 also collapses when pressure is applied.

Figure 7:
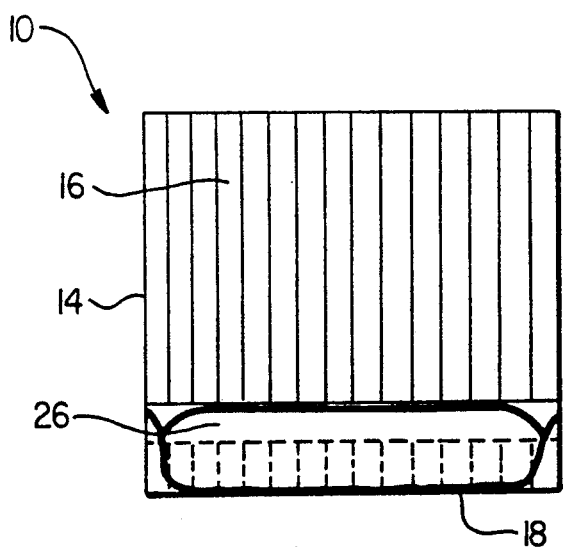
FIG. 7 is a cross-sectional view of an alternative embodiment of the receptacle.

An alternative embodiment disclosing a variation in the connection of the parachute bottom 18 is shown in FIG. 7. The inner paper sheet 16 is cut away along a rectangular section 26 of the outer paper sheet 14. The parachute bottom is connected to the outer paper sheet 14 along the section 26.

Other variations of the above disclosed description of the present invention include variations in size, materials, shape, form, function and manner of operation, assembly and use. Additionally, all equivalent relationships to those illustrated in the drawings and described are intended to be inclusive of the present invention.

While the use of a single-sided corrugated paper material is disclosed to construct inner paper sheet 16, it is to be understood that enhanced insulative effectiveness and temperature stability performance can be enhanced by constructing additional walls between the inner paper sheet 16 and the outer paper sheet 14 of the receptacle 10, made of a heat resistant material that is impermeable to moisture such as a foil-like material or plastic film. The enhancements can also be accomplished by laminating the existing walls with a heat resistant, water resistant coating.

Although a maintained temperature range is accomplished solely within the application of single-sided corrugated material, resulting from the natural properties of corrugated paperboard material, it is understood that enhanced cooling effectiveness and temperature stability performance can be achieved by treating the corrugated medium with a potential salt or other non-toxic chemical. The addition of a potential salt takes advantage of the condensation on the sides of the beverage container, which is produced by bringing chilled containers into ambient temperatures creating an endothermic environment surrounding the beverage container.

It is understood that further variations may be made in the present invention without departing from the scope of the invention. For example, a hotter rather than cooler temperature can be maintained, various beverage containers including cups, glasses, mugs, and the other containers can be accommodated including a variety of shapes and sizes, and the height and inner diameter of the receptacle can be varied to accommodate all sizes of beverage containers. Further, the application of the invention can be changed from beverages for personal consumption to other fields which require the properties of the present invention, such as liquids used in the medical or veterinary professions. Of course, other variations can be made by those skilled in the art without departing from the invention as defined in the appended claims.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A collapsible receptacle for insulating a beverage container, said receptacle comprising:

an outer sleeve of pliable, insulative, paper material for providing a print medium for high quality color separation printing on the outer surface of said outer sleeve;

an inner sleeve connected to the inner surface of said outer sleeve, said inner sleeve comprising an upper section, a spaced lower section defining a channel between said upper section and said lower section and exposing a portion of the inner surface of said outer sleeve, and corrugations for embracing the beverage container; and a collapsible, parachute-type restraint sealably connected to the exposed portion of the inner surface of said outer sleeve for receiving the bottom of the beverage container, said restraint being receivable within said channel.

2. The receptacle of claim 1 wherein said inner sleeve is a pliable, insulative material for producing an insulative effect between the beverage container and said outer sleeve.

3. The receptacle of claim 1 wherein said inner and outer sleeves are recyclable and biodegradable.

4. The receptacle of claim 1 wherein the corrugations of said inner sleeve are arranged such that when the receptacle is collapsed, facing corrugations interlock with one another.

5. A collapsible receptacle for insulating a beverage container, said receptacle comprising:

an outer sleeve of pliable, insulative, paper material for providing a print medium for high quality color separation printing on the outer surface of said outer sleeve;

at least one intermediate sleeve of pliable material positioned within and connected to the inner surface of said outer sleeve, said intermediate sleeve being water resistent for preventing condensation on the beverage container from reaching said outer sleeve;

an inner sleeve of pliable material positioned within and connected to the inner surface of said intermediate sleeve, said inner sleeve comprising corrugations for embracing the beverage container, said corrugations being arranged such that when the receptacle is collapsed, facing corrugations interlock with one another; and a collapsible, parachute-type restraint connected near one end of one of said sleeves for receiving the bottom of the beverage container.

6. The receptacle of claim 5 wherein said inner, intermediate, and outer sleeves are recyclable and biodegradable.

7. The receptacle of claim 5 wherein said intermediate sleeve is foil material for providing additional thin insulation.

8. The receptacle of claim 5 further comprising a second intermediate sleeve comprising a foil material for providing additional thin insulation.

9. A collapsible receptacle for insulating a beverage container, said receptacle comprising:

an outer sleeve of pliable, insulative, recyclable, biodegradable, paper material for providing a print medium for high quality color separation printing on the outer surface of said outer sleeve;

a pliable, insulative, recyclable, biodegradable inner sleeve connected to the inner surface of said outer sleeve for providing an insulative effect between the beverage container and said outer sleeve, said inner sleeve comprising corrugations for embracing the beverage container, said corrugations being arranged such that when the receptacle is collapsed, facing corrugations interlock with one another; and a water resistant intermediate sleeve positioned and connected between said inner and outer sleeves; and a collapsible, parachute-type restraint sealably connected near one end of one of said sleeves for receiving the bottom of the beverage container, said restraint comprising pre-formed folds for inducing said restraint to fold up within said inner sleeve when the receptacle is collapsed.

* * * * *